United States Patent [19]

Raehse et al.

[11] Patent Number: 5,013,832

[45] Date of Patent: May 7, 1991

[54] PROCESS FOR WORKING UP WATER-SOLUBLE CELLULOSE DERIVATIVES HAVING HIGH FLOCCULATION POINTS

[76] Inventors: Wilfried Raehse, Kolhagenstrasse 44, 4000 Duesseldorf 13, Fed. Rep. of Germany; Willi Wuest, Fasanenring 32, 4030 Ratingen, Fed. Rep. of Germany; Guenther Just, Verdistrasse 48, 4010 Hilden, Fed. Rep. of Germany

[21] Appl. No.: 86,439

[22] Filed: Aug. 17, 1987

[30] Foreign Application Priority Data

Aug. 25, 1986 [DE] Fed. Rep. of Germany ....... 3628826

[51] Int. Cl.$^5$ ................... C08B 11/193; C08B 11/08; C08B 11/12; C08B 11/02
[52] U.S. Cl. ........................................ 536/90; 536/91; 536/95; 536/96; 536/97; 536/98; 536/99
[58] Field of Search ....................... 536/58, 90, 91, 95, 536/96, 97, 98, 99

[56] References Cited

U.S. PATENT DOCUMENTS 3,769,247  4/1972  Glomski et al. .................... 536/58

FOREIGN PATENT DOCUMENTS 0194877  9/1986  European Pat. Off. .
475466  11/1937  United Kingdom .

Primary Examiner—Nathan M. Nutter
Attorney, Agent, or Firm—James K. Luchs

[57] ABSTRACT

A process for working up water-soluble cellulose derivatives, more especially with flocculation points above 85° C., after removal by condensation of readily volatile constituents of the crude product mixture resulting from an etherification reaction, by suspension of the crude product in hot water and subsequent separation of the suspension and washing liquids, wherein the separation of the suspension and washing liquids is carried out at elevated temperature and under pressure applied to the separator as a whole.

1 Claim, No Drawings

PROCESS FOR WORKING UP WATER-SOLUBLE CELLULOSE DERIVATIVES HAVING HIGH FLOCCULATION POINTS

BACKGROUND OF THE INVENTION

1. Field of the Invention

This invention relates to a new process for working up water-soluble cellulose derivatives having high flocculation points. For example, the process of the invention enables cellulose ethers of all kinds to be economically worked up.

2. Statement of Related Art

Methyl cellulose itself and derivatives thereof, for example methyl hydroxyalkyl celluloses, are used in a number of technical fields. Accordingly, their production on an industrial scale from inexpensively obtainable raw materials has recently received greater attention. In particular, processes by which methyl cellulose and its derivatives can be prepared in high yields under economically reasonable reaction conditions are acquiring increasing significance. In the context of such production processes which essentially comprise the steps of (a) disintegrating the cellulose starting material (cotton linters, pulps of woods of various origin, etc.),
(b) soaking the cellulose with alkalis, generally NaOH, to open up the lattice structure,
(c) etherification (generally with alkyl halides and with alkylene oxides),
(d) working up the crude product to remove unwanted secondary products and
(e) conditioning, the working up of the crude products (step (d)) is acquiring increasing significance. In this process step, the cellulose ether or cellulose mixed ether prepared in the etherification reaction is freed from the secondary products (methanol, dimethylether, (poly)alkylene glycols, NaCl, etc.) after discharge from the reactor. The product freed from sodium chloride and from the glycols with hot water is then delivered to the conditioning or working-up steps (drying, size-reduction, sieving, etc.).

To separate the by-product NaCl formed in quantities stoichiometric to the alkali metal hydroxide, the cellulose ether has hitherto normally been suspended in hot water, the sodium chloride dissolving immediately. In the prior art, the separation of the aqueous salt-containing phase from the cellulose ether is effected in centrifuges at temperatures of from 70° C. to 90° C.

To avoid losses of pure cellulose mixed ether in this process step, the suspension of the crude product in hot water and the subsequent separation by centrifuging have to be carried out distinctly above the flocculation point of the particular cellulose mixed ether, i.e. distinctly above the temperature at which the particuar cellulose ether flocculates from its solutions. At temperatures below the flocculation point, at least part of the crude product is dissolved and accordingly cannot be isolated in solid form.

Flocculation, which is characterized by the flocculation point, takes place over a relatively broad temperature range which is dependent upon the raw material used, upon the consistency of substitution, upon the degree of etherification and upon the product viscosity.

Although the requirement that suspension and centrifuging should be carried out above the flocculation point is readily satisfied for methyl cellulose itself because the flocculation point is between 35° and 65° C., depending on the average degree of substitution, problems arise for the hydroxyalkyl derivatives of methyl cellulose required in increasing quantities in industry due to the fact that their flocculation points increase distinctly even with low percentage contents of hydroxyalkyl groups in the polymer molecule. The same applies to the introduction of carboxymethyl groups into the methyl cellulose.

The working up of methyl cellulose derivatives by the abovedescribed and, hitherto, generally applied process became more difficult as the flocculation point rose increasingly through an increase in the degree of hydroxyalkylation for possibly lower methoxylation. In the case of methyl cellulose derivatives having flocculation points above 85° C. and generally above 75° C., clear product losses could not be avoided because the temperature in the suspension and in the separation step moved into the vicinity of or, in some cases, below the flocculation point. Cooling is intensified by air ventilation during the centrifuging step so that purified methyl cellulose derivative was partly dissolved. Hitherto, no measures have been proposed for changing this situation or rather for avoiding this problem.

STATEMENT OF THE INVENTION

Other than in the operating examples, or where otherwise indicated, all numbers expressing quantities of ingredients or reaction conditions used herein are to be understood as modified in all instances by the term "about".

An object of the present invention is to provide a process for working up methyl cellulose derivatives which enables even products having flocculation points above 75° C. and more especially above 85° C. to be worked up without significant product losses, i.e. in high yields. This process is workable on an industrial scale using known machines and apparatus. Another object of the invention is to carry out this critical working up step as efficiently as possible, i.e. working up should proceed, so far as possible, in the same apparatus.

The invention applies both to water-soluble cellulose derivatives containing methoxyl groups; to those containing hydroxyalkyl groups (hydroxyethyl, hydroxypropyl); and to those containing carboxymethyl groups. The only requirement is that the cellulose derivatives have a flocculation point.

The invention relates to a process for working up watersoluble cellulose derivatives, more especially with flocculation ponts above 85° C., after the removal by condensation of readily volatile constituents of the crude product mixture resulting from the etherification reaction by suspension of the crude product in hot water and subsequent separation of the washing liquid, wherein all the steps involved, namely mashing, product discharge, preparation of the suspension, separation of the mother liquor and the washing liquids, are carried out under a pressure above 1 bar.

In preparation for the process of the invention, the product mixture resulting from the etherification reaction is freed from the generally readily volatile organic secondary products of the etherification reaction and from the excess of etherifying agent by known methods. This is normally done by condensing off the organic compounds, more especially methyl chloride, dimethyl ether and methanol. This leaves a crude product which essentially contains only substantially nonvolatile constituents, mainly the desired cellulose mixed ether, sodium chloride, excess alkali from process step (b) (soaking of the raw material with alkali) and water and the glycols or glycolates.

This crude product is suspended in hot water having a temperature of from 100° to 120° C. in the process of the invention for working up methyl cellulose derivatives. This mixture of crude product and water, which is normally called the "mash", is discharged from the reactor and stored under pressure in a receiver. The product can be purified in this form or after neutralization of the residual alkali.

From the pressurized receiver, the mash is delivered to a separation unit to which, overall, a counterpressure has been applied.

Commercially available machines and apparatus can be used as separators in the process of the invention, including for example closed centrifuges, decanters, pressure filters or similar solidliquid separators. Pressure filters are preferably used in the process of the invention for working up methyl cellulose derivatives. These pressure filters are designed so that pressure can be applied both to the influent and to the effluent, i.e. a pressure above atmospheric pressure prevails on the mash side and on the filtrate side. In addition to the above-mentioned apparatus, however, it is also possible to use other apparatus known to those skilled in the art for such purposes.

In one preferred embodiment, the process for working up methyl cellulose derivatives is carried out under a pressure of from 1.1 to 7 bar applied to the separator as a whole and preferably under a pressure of from 1.5 to 3 bar. Thus, an excess pressure of from 0.5 to about 2 bar prevails throughout the separator as a whole, for example in the pressure filter used to separate off the washing liquid, both on the mash side and on the filtrate side. This procedure is particularly advantageous because a reduction in the temperature of the washing liquid below 100° C. is safely avoided and because evaporation of the washing water and of the mother liquor can be prevented by virtue of the pressure applied to the separator as a whole. It is thus possible to carry out all washing and filtration steps above the flocculation point of the methyl cellulose derivatives to be purified and to avoid product losses through dissolution of the cellulose ether to be purified.

In another preferred embodiment of the invention, a temperature of the washing liquid at least 10° C. above the flocculation point of the methyl cellulose derivative to be purified is adjusted during separation of the mashing and washing liquid in which pressure is applied to the separator as a whole. The temperature of the washing liquid is preferably adjusted to between 100° and 160° C. and more preferably to between 105° and 120° C. According to the invention, this ensures that the solubility of the particular methyl cellulose derivative in the aqueous medium is so low that product losses are largely avoided.

The new process of the invention for working up water-soluble cellulose derivatives can be carried out both continuously and in batches. In one batch procedure, it is possible—as in the prior art—to repeat the process steps of suspension in hot water with subsequent separation of the washing liquid in order to obtain a product of particularly high purity, the difference in the process of the invention being that pressure is applied to the entire apparatus used for separation of the washing liquid.

To reduce the demand for washing water, working up may be carried out in countercurrent, the washing water separated off from the last washing stage being returned to the penultimate washing stage, etc. or being used for mashing the next batch. For example, the washing water of the second separation step separated off by filtration may be used for mashing the crude product emanating directly from the etherification step.

In the preferred embodiment, the separation of the mashing water and the washing liquid is carried out in one and the same apparatus. Countercurrent operation is again possible through division of the quantity of washing liquid.

In another embodiment of the process of the invention for working up water-soluble cellulose derivatives of high flocculation point, it is additionally possible to permanently reduce the residual moisture of the filtered product on the filter by passing through dry superheated steam. To this end, the filter cake purified after the washing liquid has been squeezed out is treated under pressure with dry superheated steam. Such superheated steam is under an elevated pressure of for example around 4 bar at a temperature of 130° C. This drives the moisture ("filling water") out of the filter cake so that the product obtained has only a low residual moisture content, for example of from 25 to 40%. The residual moisture content can also be reduced by blowing nitrogen or air through at elevated temperature.

The process of the invention also has the advantage that only small quantities of washing water have to be used. Accordingly, it may also be used as a working up process for all cellulose derivatives, for example for methyl cellulose and hydroxypropyl cellulose derivatives of relatively low flocculation point and also for solvent washing in the purification of carboxymethyl and hydroxyethyl celluloses.

The invention will be illustrated but not limited by the following example.

EXAMPLE

A methyl hydroxyethyl cellulose (MHEC) having the following characteristic end-product data was prepared by reaction of alkalized cellulose with methyl chloride in the presence of ethylene oxide:

Brookfield viscosity of a 2% mix at 20° C.: 12,000 mPas;

$OCH_3$ content: 22.1%

EtOH content: 8.9% and flocculation point: 91° C.

After the reaction, the crude product had a residual moisture content of 29.8% and a sodium chloride content of 27.4%. This crude product was used for the washing tests.

After removal from the reactor, the crude product was transferred with eleven times the quantity by weight of water, based on the dry crude product, to a pressure vessel and heated to a temperature of 120° C. (at approx. 3 bar). The hot suspension was pumped under excess pressure to a continuous pressure filter where first the mother liquor was separated off under a pressure of 1.7 bar (excess pressure 0.7 bar).

After removal of the "filling water" by dry superheated steam at a temperature of 120° C. under a pressure of approx. 3 bar, the product was washed with water under pressure (approx. 3 bar) at a temperature of 120° C. The quantity of washing water used was six times the quantity by weight of the dry methyl hydroxyethyl cellulose.

After washing, the filling water still present after the filtration step was removed with dry superheated steam at 120° C. under a pressure of approx. 3 bar. The product was then removed from the filter using a scraper.

The test filter had a surface area of approx. 0.1 m² for a specific filter capacity of approx. 250 kg bone-dry MHEC/m²/h. The product obtained in this way had a residual moisture content of 36%; the sodium chloride content of the pure product was below 0.5%.

A methyl cellulose derivative having a flocculation point of 91° C.—purified as described above—cannot be worked up by the hitherto known processes for purifying methyl cellulose derivatives.

We claim:

1. In a process for the preparation of a water-soluble cellulose derivative comprising the steps of soaking cellulose with alkalis to open up the lattice structure, etherification thereof, removal of relatively volatile components from the resulting crude reaction mixture, and suspension of the crude product in hot water followed by separation of the suspended product from the hot water, the improvement wherein the suspension of the crude product in hot water and separation of the suspended product from the hot water are both carried out at a pressure above 1 bar and a temperature of from 105° C. to about 120° C. and said water soluble cellulose derivative has a flocculation point above 75° C. and is selected from the group consisting of methyl cellulose, hydroxyethyl cellulose, hydroxypropyl cellulose, carboxymethyl cellulose and methyl hydroxyethyl cellulose.

* * * * *